(12) United States Patent
Klausner et al.

(10) Patent No.: US 7,630,834 B2
(45) Date of Patent: Dec. 8, 2009

(54) AUTONOMOUS IN-VEHICLE NAVIGATION SYSTEM AND DIAGNOSTIC SYSTEM

(75) Inventors: Markus Klausner, Wexford, PA (US); Arne Dietrich, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 12/060,381

(22) Filed: Apr. 1, 2008

(65) Prior Publication Data

US 2008/0183386 A1  Jul. 31, 2008

Related U.S. Application Data

(62) Division of application No. 10/017,093, filed on Dec. 13, 2001, now Pat. No. 7,363,149.

(51) Int. Cl.
*G01C 21/00* (2006.01)
(52) U.S. Cl. ........................ 701/213; 701/207
(58) Field of Classification Search ......... 701/200–202, 701/207–208, 213–215; 340/988; 342/357.06, 342/357.1
See application file for complete search history.

(56) References Cited

U.S. PATENT DOCUMENTS

| | | | |
|---|---|---|---|
| 5,416,712 A | 5/1995 | Geier et al. | |
| 5,508,594 A | 4/1996 | Underwood et al. | |
| 5,892,927 A | 4/1999 | Boehmer et al. | |
| 6,175,787 B1 | 1/2001 | Breed | |
| 6,289,332 B2 | 9/2001 | Menig et al. | |
| 6,295,492 B1 | 9/2001 | Lang et al. | |
| 6,380,890 B1 | 4/2002 | Sminth et al. | |
| 6,493,629 B1 | 12/2002 | Van Bosch | |
| 6,573,831 B2 * | 6/2003 | Ikeda et al. ................. | 340/505 |
| 6,577,934 B2 | 6/2003 | Matsunaga et al. | |
| 6,584,402 B2 * | 6/2003 | Fukushima et al. ......... | 701/202 |
| 6,643,571 B2 | 11/2003 | Gotvall et al. | |
| 6,677,854 B2 | 1/2004 | Dix | |
| 6,882,917 B2 | 4/2005 | Pillar et al. | |
| 2002/0110146 A1 | 8/2002 | Thayer et al. | |
| 2002/0156558 A1 | 10/2002 | Hanson et al. | |

FOREIGN PATENT DOCUMENTS

| | | |
|---|---|---|
| DE | 195 37 814 | 4/1997 |
| DE | 196 38 324 | 11/1997 |
| DE | 197 28 083 | 2/1999 |
| JP | 2000508499 | 7/2000 |

(Continued)

OTHER PUBLICATIONS

U.S. Appl. No. 60/268,254, filed Feb. 2001, Thayer et al.

(Continued)

*Primary Examiner*—Yonel Beaulieu
(74) *Attorney, Agent, or Firm*—Kenyon & Kenyon LLP

(57) ABSTRACT

A method and system for a wireless interface to the electronics of an automotive vehicle for a remote application in the vehicle or within communication range of the vehicle. The remote application may be a navigation system using vehicle motion sensor data to provide or improve a navigation solution for the vehicle. In an alternative embodiment, the remote application is diagnostic software running on a handheld computer that evaluates vehicle systems in a diagnostics procedure.

19 Claims, 2 Drawing Sheets

FOREIGN PATENT DOCUMENTS

| | | |
|---|---|---|
| JP | 2000373979 | 12/2000 |
| JP | 2001239897 | 9/2001 |
| WO | WO 98/31118 | 7/1998 |
| WO | WO 00/72463 | 11/2000 |

OTHER PUBLICATIONS

European Search Report for EP 02 07 9641.3, Date of Completion Aug. 4, 2006.

English Language Abstract of DE 197 28 083.
English Language Abstract of DE 196 38 324.
European Search Report for EP 02 07 9641, Date of Completion Apr. 20, 2006.
Wunderlich H. et al., Jun. 13, 2000, "Opening Bluetooth For technical Tasks—Possibilities And challenges For Automotive Applications" Bluetooth Conference, pp. 1-16.
Gabler, U.: "Temporary engagement", Traffic Technology International, pp. 100-101.

* cited by examiner

AUTONOMOUS IN-VEHICLE NAVIGATION SYSTEM AND DIAGNOSTIC SYSTEM

CROSS-REFERENCE TO RELATED APPLICATION

This application is a divisional of, and incorporates herein by reference in its entirety, U.S. patent application Ser. No. 10/017,093, which was filed on Dec. 13, 2001, and which issued on Apr. 22, 2008 as U.S. Pat. No. 7,363,149.

FIELD OF THE INVENTION

The present invention relates to an in-vehicle device for vehicle navigation and/or vehicle system diagnostics. More specifically, the present invention relates to an in-vehicle device that uses a wireless connection to a vehicle bus system to obtain real-time vehicle data useful in determining a position of the vehicle for use in a navigation system, and to obtain error codes from vehicle systems useful in diagnosing a vehicle system's status.

BACKGROUND INFORMATION

Access to in-vehicle electronics is known in the art. Access to in-vehicle electronics currently requires special hardware that is connected directly to the vehicle bus through some physical connection. Traditional built-in in-car navigation systems use vehicle data such as wheel speed and steering angle to extrapolate from a former navigation solution. In the case of a satellite-based positioning system, for instance GPS (Global Positioning System), if there is no GPS signal available, the current navigation solution is approximated by using the vehicle data to extrapolate from the last-received (or former) GPS position. Internal vehicle data increases both precision and coverage of the navigation solution. Diagnostics systems use vehicle data obtained from a vehicle bus to assist an automotive technician in diagnosing and repairing vehicle systems.

There are several inherent problems with the current method of accessing in-vehicle electronic information for the purpose of improving a navigation solution or for the purpose of vehicle diagnostics. One problem is the cost of creating a hardwire connection from the vehicle bus to a navigation system or a handheld computer. For the case of the navigation system, this cost is due in part to the fact that most navigation systems are currently installed in the aftermarket. For the case of vehicle diagnostics, this cost is due in part to the fact that most diagnostic systems are only installed temporarily. Therefore, each installation is essentially a custom job, requiring a relatively large amount of time from an experienced automobile technician. Additionally, it may be difficult to find a connection to the vehicle bus if the automobile technician is not entirely familiar with the layout of the car, adding to the total time expended.

Another problem with the current method of attachment to the in-vehicle electronics is the flexibility provided by the vehicle bus connection. With the connector attached to the vehicle, the operator is often forced to use a specific navigation system, or a specific diagnostics computer, which the connector is designed to accommodate. A vehicle operator might want to use the navigation system (or vehicle diagnostics computer) outside the vehicle, and therefore the connection must be disconnectable. Additionally, the vehicle operator might want to upgrade or change the navigation system (or vehicle diagnostics computer) for the vehicle, possibly requiring a new connection to the vehicle bus, or a specialized adapter for the old bus connector. The uncertainty and non-uniformity in the connections to the vehicle bus have a substantial effect on the cost of both in-vehicle navigation systems and vehicle diagnostics systems, and have therefore had a profoundly negative effect on the use of in-vehicle navigation systems and vehicle diagnostics systems.

U.S. patent application Ser. No. 09/687,181 describes a system for providing short-range wireless access to data on vehicle buses and data in the memory of electronic control units (ECUs) via a wireless link. This application discusses interfacing a CAN (Controller Area Network) protocol on the vehicle bus communicating with a gateway node and Bluetooth hardware set.

Mobile navigation systems, as described in Gabler, U.; "Temporary engagement", Traffic Technology International, pp. 100-101, can consist of a handheld computer, a cell phone, and/or a GPS receiver. These systems, referred to as component-based mobile navigation systems (CBMNS), can be used both inside and outside a vehicle, in contrast to an in-vehicle navigation system, which is used exclusively within the vehicle.

While in-car navigation systems are an integral part of the vehicle, the component-based mobile navigation system uses less expensive components that may also be useful for functions other than navigation.

SUMMARY OF THE INVENTION

The present invention accesses a vehicle bus either for sensor data concerning vehicle motion for a navigation system, or for system health data for a vehicle diagnostic computer. By accessing vehicle data from a vehicle bus without the requirement of a physical connection, the system, method, and device of the present invention eliminate the above-mentioned problems and enable a navigation system to take advantage of vehicle sensor values to improve a position solution for the vehicle. The system, method, and device of the present invention also enable diagnostics information from the vehicle bus to be accessed at a remote terminal, thereby allowing the user to display and analyze vehicle diagnostics on a handheld computer or other appropriate unit.

A system for navigating a vehicle is provided including a vehicle sensor connected to a vehicle bus connected to a gateway node, and a processor in the vehicle communicating wirelessly with the gateway node and connected to a vehicle positioning system. The sensor measures a value and then transmits the value over the vehicle bus to the gateway node using a network protocol. The gateway node then wirelessly transmits the value to the processor using a wireless communication protocol. The processor receives an initial position from the positioning device and calculates a current position using a former position, the initial position, and the sensor value. A protocol translation device is disclosed that may include two different protocols and an intermediate, network-independent protocol. In one embodiment of the invention, an emerging worldwide standard, Bluetooth, created by the Wireless Personal Area Network (WPAN) Working Group (IEEE 802.15), provides a wireless interface to the electronics in the vehicle via a Controller Area Network (CAN). CAN is an international standard documented in ISO 11898 (for high-speed applications) and ISO 11519 (for lower-speed applications). A remote application, such as a navigation system or a hand-held computer running navigation software, can connect to this interface via a host inside the vehicle or within communication range of the vehicle.

According to an embodiment of the present invention, a protocol translation can occur from the Controller Area Network (CAN) protocol to the Bluetooth protocol in a gateway node electrically coupled to the vehicle bus. The signal can then be transmitted in the Bluetooth protocol from the gateway node to an external receiver via a wireless link.

Such an interface would enable external devices, such as a stand-alone navigation system or a handheld computer running navigation software and connected to a navigation system, to subscribe to certain signals on the vehicle bus, or to interrogate a vehicle's electronic control units (ECUs), without interfering with the vehicle's operation.

A system is also provided for monitoring an apparatus in a vehicle. The system includes a sensor for sensing an error code of the apparatus, a gateway node electrically coupled to the vehicle bus, and a processor. The processor may be situated within the vehicle, in proximity to the vehicle, or in long range wireless contact (e.g., by a cellphone connection) with the short range wireless hardware. The sensor, either in response to an interrogatory from a diagnostics software or on its own initiative, communicates the error code to the gateway node via the vehicle bus using a network protocol. The gateway node communicates the error code to the processor using a wireless communication protocol. The processor either displays the error code, uses a look-up table to analyze the error code, or stores the error code for retrieval at a later time.

U.S. patent application Ser. No. 09/687,181, the subject matter of which is expressly incorporated by reference herein, concerns a node in an in-vehicle bus network that comprises gateway functionality for passing messages from the in-vehicle bus to a remote host. The referenced application also concerns a wireless communication chipset for establishing, maintaining, and controlling a wireless link between the node and one or several remote hosts. The invention of the referenced application is described with CAN (Controller Area Network) as the in-vehicle communication protocol and Bluetooth as the short-range wireless communication standard.

DETAILED DESCRIPTION

Figure 1:
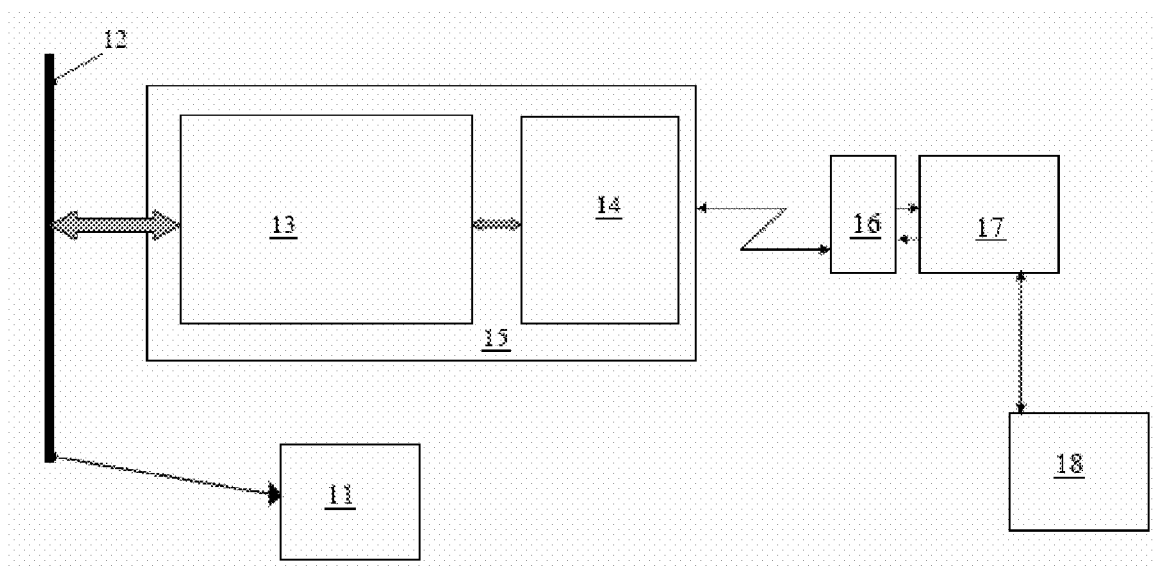
FIG. 1 shows a block diagram of a specific CAN-to-Bluetooth embodiment of the present invention.

FIG. 1 shows a block diagram of a specific CAN-to-Bluetooth embodiment of the present invention. Any wireless communication system, however, could be used to connect the vehicle sensor to the processor. FIG. 1 shows a sensor 11 electrically coupled to a vehicle bus 12. In one embodiment, the sensor data is used to assist in positioning the vehicle, and therefore any variable, both measured and observed (e.g. derived from other measured signals, using models), showing direction, change of direction, speed, acceleration, or deceleration, would be useful in the positioning calculation. Sensor 11 may therefore be a wheel speed sensor, a velocity sensor, a yaw rate sensor, a steering angle sensor, a body-slip angle sensor, an attitude sensor, an inertial sensor, or any other sensor for data concerning the status of a vehicle.

The vehicle bus 12 operates in one exemplary embodiment under a CAN (Controller Area Network) protocol. Vehicle bus 12 may be any one of several vehicle bus systems present in the vehicle. Vehicle bus 12 is electrically coupled to gateway node 15. In one exemplary embodiment, gateway node 15 is a CBGWN (CAN-Bluetooth gateway node). Gateway node 15, including controller 13 and Bluetooth hardware 14, is situated in the vehicle. Vehicle bus 12 couples directly to controller 13, which in turn is electrically coupled to Bluetooth hardware 14. The controller 13 controls the communication between the vehicle bus 12 and the Bluetooth hardware 14. In one exemplary embodiment, gateway node 15 is installed during production of the vehicle, thereby reducing the cost of providing sensor data to an aftermarket component (either navigational, diagnostic, or other).

Bluetooth hardware 14 communicates wirelessly with remote Bluetooth hardware 16. Remote Bluetooth hardware 16 is electrically coupled with processor 17. Processor 17 is electrically coupled to positioning device 18. Any of remote Bluetooth hardware 16, processor 17, and positioning device 18 may be integrated in one unit, or each may be a separate unit. Positioning device 18 may be a handheld computer running navigation software. Positioning device 18 may use any number of positioning methods to determine the current position and to monitor progress along the selected route. These positioning systems may include GPS, DGPS (Differential GPS), AGPS (Assisted GPS), triangulation, hyperbolic intersection of time-delay solutions, and cell identification to position the user.

Processor 17 may include a memory (not shown) used to store a former position. Processor 17 may use a current position from positioning device 18 along with a former position and a sensor datum or sensor data to calculate a corrected current position. This calculation may be important for providing reliable positioning information in an area of low-satellite coverage or no-satellite coverage (e.g. tunnels, parking garages, downtown areas), where the positioning device is a satellite-based positioning system. In areas with low- or no-satellite coverage, the quality of the current position output by the positioning device is reduced. Similarly, multipath problems may reduce the quality of either a satellite (e.g. GPS) positioning system or a cellphone-based system. By using sensor data to determine the movement of the vehicle with respect to the former position, an improved position solution is possible.

In the method according to the present invention, a signal from a sensor is provided to the vehicle bus. The signal may be output by any one of four wheel speed sensors, a steering angle sensor, a velocity sensor, a yaw rate sensor, a body-slip angle sensor, an attitude sensor, an inertial sensor, or any other sensor. A controller connected to the vehicle bus, for instance a CAN controller in the situation where the vehicle bus is operated as a Controller Area Network, reads the sensor data from the vehicle bus and communicates the data to a short-range wireless transmitter, for instance a Bluetooth hardware set. The sensor data is transmitted wirelessly to another wireless transmitter that is incorporated in a component based mobile navigation system (CBMNS). The sensor data is then available at the processor that is running a navigation software. The navigation system is therefore able to use the vehicle motion sensor data to extrapolate from the former position stored in a memory. The extrapolated position can then be compared to current position data. The extrapolated position can then be averaged with the current position to solve for a corrected current position. Additionally, this averaging can be variably weighted depending on the quality of the current position data. For instance, the current position data may be heavily weighted when the quality of the current positioning data is high due to good or excellent satellite coverage. Alternatively, the extrapolated position may be more heavily weighted in the averaging process when the quality of the current positioning data is low, for instance when there is no- or low-satellite coverage.

In another embodiment, the sensor data is used in a diagnostic procedure to evaluate the vehicle systems. Sensor 11 may therefore also be any type of sensor evaluating another vehicle system or, alternatively, any system with self-diagnosing capabilities (i.e. any system capable of evaluating its own status). The data transmitted by sensor 11 in this exemplary embodiment would therefore be either an error or fault code, a health status, or an "all OK" signal. The error or fault code may be extracted from a look-up table by the sensor during the diagnostic procedure. Sensor 11 may transmit its status, in the form or any of the error or fault code, the health status, or the "all OK" signal, in response to an interrogatory from the diagnostic system communicated to the sensor 11 on the vehicle bus. Alternatively, sensor 11 may transmit its status on its own initiative, either upon sensing a fault, at a preset time, after a preset time interval, or upon commencing or completing a procedure (e.g. start-up).

The status of sensor 11 might be communicated to the vehicle bus 12, where the controller 13 could read the status off the bus and communicate it to Bluetooth hardware 14 (or any other appropriate short-range wireless transmitter). Bluetooth hardware 14 might transmit the status code to remote Bluetooth hardware set 16 (or another short-range wireless transmitter). Remote Bluetooth hardware set 16 might communicate the status code to processor 17, which might be a handheld computer running a diagnostic program. Remote Bluetooth hardware set 16 may be incorporated with processor 17 in one integrated unit, or the two units may be separate but electrically coupled.

Processor 17 may be running a diagnostics program and the look-up table might be reproduced in processor 17, so that after receiving the error code, processor 17 would provide an error message to a user (not shown) indicating the sensor or system problem. Alternatively in this embodiment, a health status may be transmitted by sensor 11. The health status might indicate any of a healthy state, an unhealthy state, or a percentage or variably healthy state. Further in this embodiment, the sensor 11 may transmit simply an "all OK" signal. In the event a signal other than an "all OK" is transmitted, the processor may also communicate to a user a suggested course of conduct (e.g. "see a technician").

Remote Bluetooth hardware 16 and processor 17 may be permanently positioned in the vehicle, may be portable and therefore removable from the vehicle, or may be permanently positioned outside the vehicle. Some examples of situations where remote Bluetooth hardware 16 and processor 17 are permanently positioned outside the vehicle include being positioned for use in close proximity to the vehicle, such as in a service garage or home garage. In another embodiment, remote Bluetooth hardware 16 may be positioned within or close to the vehicle, and may be electrically coupled to a long range wireless transmitter (e.g. a cellphone, not shown). The cellphone connected to the Bluetooth hardware 16 may wirelessly communicate with processor 17 by any of various known methods, thereby providing remote diagnostic capabilities at any distance from the vehicle.

Figure 2:
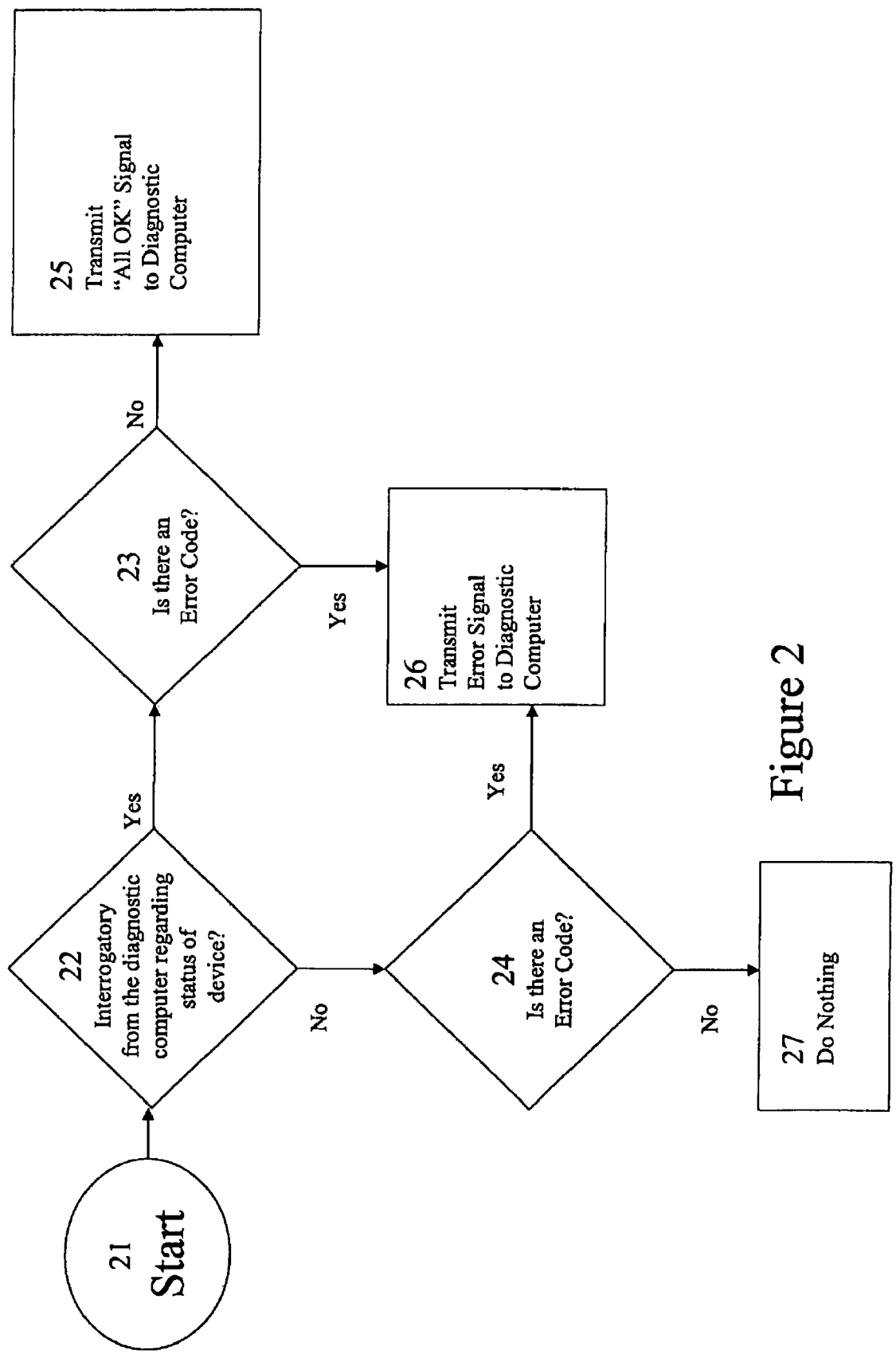
FIG. 2 shows a flow chart illustrating the method according to another embodiment of the present invention.

FIG. 2 illustrates a flowchart for the decision process of a diagnostic device according to the present invention starting in circle 21. The device determines if there has been an interrogatory from the diagnostic computer regarding status of the device in decision diamond 22. If the answer is "yes," the flow is to decision diamond 23, while if the answer is "no," the flow is to decision diamond 24. Decision diamond 23 asks whether there is an error code. If the answer is "no," the flow is to box 25, while if the answer is "yes," the flow is to box 26. Box 25 indicates an "all OK" signal is transmitted to the diagnostic computer. Box 26 indicates an error signal is transmitted to the diagnostic computer. Decision diamond 24 asks whether there is an error code. If the answer is "yes," the flow is to box 26, while if the answer is "no," the flow is to box 27. Box 26, as noted above, indicates an error signal is transmitted to the diagnostic computer. Box 27 indicates that no action is taken.

Although several embodiments are specifically illustrated and described herein, it will be appreciated that modifications and variations of the present invention are covered by the above teachings and within the purview of the appended claims without departing from the spirit and intended scope of the invention. In particular, though a Bluetooth hardware set using a Bluetooth protocol is illustrated in one exemplary embodiment, any short range wireless standard may be utilized in the present invention.

What is claimed is:

1. A system for navigating a vehicle comprising:
at least one sensor situated in the vehicle, the at least one sensor configured to sense at least one datum corresponding to at least one of an instantaneous sensor value and a time-averaged sensor value, the at least one sensor electrically coupled to a vehicle bus;
a gateway node situated in the vehicle, the gateway node electrically coupled to the vehicle bus, the at least one sensor configured to communicate the at least one datum to the gateway node via the vehicle bus using a network protocol;
a processor, the gateway node configured to communicate the at least one datum to the processor using a wireless communication protocol; and
a positioning device, the positioning device electrically coupled to the processor, the processor adapted to use at least one of a former position, an initial position, and the at least one datum to determine a current position.

2. The system of claim 1, wherein the wireless communication protocol is a Bluetooth protocol.

3. The system of claim 2, wherein the network protocol is a Controller Area Network protocol.

4. The system of claim 3, wherein the gateway node is a Controller Area Network/Bluetooth gateway node.

5. The system of claim 1, further comprising a memory, wherein the processor saves the current position in the memory, the current position becoming the former position when the processor retrieves the current position from the memory.

6. The system of claim 1, wherein the at least one sensor is at least one of a wheel speed sensor, a velocity sensor, a yaw rate sensor, a steering angle sensor, a body-slip angle sensor, an attitude sensor, and an inertial sensor.

7. The system of claim 1, wherein the processor is situated in a hand-held computer.

8. A device for navigating a vehicle comprising:
a processor, the processor configured to receive at least one datum wirelessly from a gateway node using a wireless communication protocol, the at least one datum corresponding to at least one of an instantaneous sensor value and a time-averaged sensor value; and
a positioning device coupled to the processor, the processor adapted to use at least one of a former position, an initial position, and the at least one datum to determine a current position.

9. The device of claim 8, wherein:
the wireless communication protocol is a Bluetooth protocol; and
the gateway node is a Controller Area Network/Bluetooth gateway node.

10. The device of claim 8, wherein the positioning device communicates the initial position to the processor.

11. The device of claim 8, further comprising a memory, wherein the processor saves the current position in the memory, the current position becoming the former position when the processor retrieves the current position from the memory.

12. The device of claim 8, wherein the processor is situated in a hand-held computer.

13. The device of claim 12, wherein the processor and the positioning device are integrated in one unit.

14. The device of claim 12, wherein the positioning device is at least one of a GPS receiver, a DGPS receiver, an AGPS receiver, and a cell-phone-based positioning system.

15. The device of claim 14, wherein the processor determines the current position in an area of at least one of low-coverage and no-coverage of at least one of a cellphone-based positioning system and a satellite navigation system.

16. A method for navigating a vehicle comprising:
   measuring at least one datum by at least one sensor, the at least one datum being at least one of an instantaneous value and a time-averaged value;
   transmitting electronically the at least one datum from the at least one sensor to a gateway node via a vehicle bus using a network protocol;
   transmitting wirelessly the at least one datum from the gateway node to a processor using a wireless communication protocol;
   receiving an initial position from a positioning device at the processor; and
   calculating a current position by the processor using at least one of a former position, the initial position, and the at least one datum.

17. The method of claim 16, further comprising communicating an initial position from the positioning device to the processor.

18. The method of claim 16, further comprising saving by the processor the current position in a memory, the current position becoming the former position when the processor retrieves the current position from the memory.

19. The method of claim 16, further comprising determining, by the processor, the current position in an area of at least one of low-coverage and no-coverage of at least one of a cellphone-based positioning system and a satellite navigation system.

* * * * *